(12) United States Patent
Hong

(10) Patent No.: US 9,519,499 B2
(45) Date of Patent: Dec. 13, 2016

(54) METHOD FOR DISPATCHING CENTRAL PROCESSING UNIT OF HOTSPOT DOMAIN VIRTUAL MACHINE AND VIRTUAL MACHINE SYSTEM

(71) Applicant: HUAWEI TECHNOLOGIES CO., LTD., Shenzhen (CN)

(72) Inventor: Kaixing Hong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 334 days.

(21) Appl. No.: 14/143,485

(22) Filed: Dec. 30, 2013

(65) Prior Publication Data

US 2014/0115586 A1   Apr. 24, 2014

Related U.S. Application Data

(63) Continuation of application No. PCT/CN2011/076650, filed on Jun. 30, 2011.

(51) Int. Cl.
*G06F 9/455* (2006.01)
*G06F 9/46* (2006.01)
*G06F 13/00* (2006.01)
*G06F 9/50* (2006.01)

(52) U.S. Cl.
CPC ......... *G06F 9/45533* (2013.01); *G06F 9/5077* (2013.01); *G06F 9/5083* (2013.01)

(58) Field of Classification Search
None
See application file for complete search history.

(56) References Cited

U.S. PATENT DOCUMENTS

| | | | | |
|---|---|---|---|---|
| 8,918,784 | B1* | 12/2014 | Jorgensen | G06F 9/5077 718/1 |
| 2002/0184290 | A1* | 12/2002 | Olszewski | G06F 9/5077 718/102 |
| 2005/0262504 | A1 | 11/2005 | Esfahany et al. | |
| 2007/0226449 | A1 | 9/2007 | Akimoto | |
| 2009/0031304 | A1 | 1/2009 | Song | |
| 2009/0150896 | A1 | 6/2009 | Tsushima et al. | |

(Continued)

FOREIGN PATENT DOCUMENTS

| CN | 101169731 A | 4/2008 |
|---|---|---|
| CN | 101354663 A | 1/2009 |

(Continued)

*Primary Examiner* — Bing Zhao
(74) *Attorney, Agent, or Firm* — Brinks Gilson & Lione

(57) ABSTRACT

A method for dispatching CPUs of a hotspot domain VM and system includes determining a comprehensive utilization rate of the vCPUs of the hotspot domain VM according to counted use information of the vCPUs, determining that at least one online vCPU is to be added or to be reduced for the hotspot domain VM according to the comprehensive utilization rate of the vCPUs and the maximum number of the vCPUs. After an online vCPU is added, the method further includes adjusting the vCPUs of a common domain VM in the running queue of a physical CPU bound to the online vCPU, so that the online vCPU is dispatched on the physical CPU. After an online vCPU is reduced, the vCPU of the hotspot domain VM in the running queue of a physical CPU bound to the offline vCPU is adjusted, so that the vCPU of the common domain VM is dispatched on the physical CPU.

13 Claims, 3 Drawing Sheets

(56) References Cited

U.S. PATENT DOCUMENTS

2009/0300317 A1* 12/2009 Hepkin ............... G06F 9/5077
  711/173
2011/0029971 A1    2/2011 Yamasaki et al.

FOREIGN PATENT DOCUMENTS

| CN | 101488098 A | 7/2009 |
|----|-------------|--------|
| CN | 101593134 A | 12/2009 |
| CN | 101706742 A | 5/2010 |
| CN | 101788920 A | 7/2010 |

* cited by examiner

METHOD FOR DISPATCHING CENTRAL
PROCESSING UNIT OF HOTSPOT DOMAIN
VIRTUAL MACHINE AND VIRTUAL
MACHINE SYSTEM

CROSS-REFERENCE TO RELATED
APPLICATION

This application is a continuation of International Application No. PCT/CN2011/076650, filed on Jun. 30, 2011, which is hereby incorporated by reference in its entirety.

FIELD OF THE APPLICATION

The embodiments described below relate to the computer technology, and particularly, to a method for dispatching CPUs of a hotspot domain virtual machine and a virtual machine system.

BACKGROUND OF THE APPLICATION

The virtualization technology is a decoupling method for separating bottom hardware devices from an upper-layer operation system and applications. It introduces a Virtual Machine Monitor (VMM) layer to directly manage bottom hardware resources, and create a Virtual Machine (VM) independent from the bottom hardware for a use by the upper-layer operation system and applications. The VM may be classified into a hotspot domain VM and a common domain VM. The common domain VM is created by a user to operate general tasks. The hotspot domain VM plays a pivotal role in the system and is depended by the common domain VM. In various virtualization systems, the hotspot domain VM has different features. For example, in some systems there is a driver field virtualization, through which the common domain virtualization interacts with the physical hardware.

In the VM system, the VM has no real physical resource. The CPU assigned to the VM is not a real physical CPU, but a Virtual Central Processing Unit (vCPU) assigned to the VM by the VMM. In the virtualization environment, dual-dispatching of the CPU resources exists: on one hand, an Operation System (OS) dispatcher inside the VM dispatches a thread to the vCPU; on the other hand, a VMM dispatcher dispatches the vCPU to the physical CPU. The implementation of the OS dispatcher inside the VM is dependent upon the specific OS and cannot be changed, thus the VMM dispatcher has a very important influence on the performance of the whole VM system.

Currently, the VMM dispatcher usually adopts a dispatching strategy of equally dispatching the vCPUs of the common domain VM and the hotspot domain VM, so the common domain VM may preempt the CPU time of the hotspot domain VM, which causes a poor real-time performance of the hotspot domain VM, and no response to the request from the common domain VM is made in time, particularly, when there are a large number of VMs, the whole performance may be sharply degraded. Another dispatching strategy is that the VMM dispatcher assigns a fixed physical CPU resource to the hotspot domain VM, and the number of the default vCPUs is correlative to that of the real physical CPUs. When a large number of physical CPUs are available in the system, there are also many vCPUs. On one hand, resource waste will be caused by a light system load. On the other hand, the system performance cannot be improved by increasing the vCPUs in the hotspot domain VM in case of a heavy system load, especially when too many vCPUs exist in the common domain. Therefore, the existing VM system has a low CPU resource utilization rate and a poor system performance.

SUMMARY OF THE APPLICATION

The embodiments provide a method for dispatching CPUs of a hotspot domain VM and a VM system, so as to solve the deficiency of the prior art that the VM system has a low CPU resource utilization rate and a poor system performance.

An embodiment provides a method for dispatching CPUs of a hotspot domain VM, wherein each of vCPUs of the hotspot domain VM is bound to a different physical CPU, the method including:

determining a comprehensive utilization rate of the vCPUs of the hotspot domain VM according to counted use information of the vCPUs of the hotspot domain VM, wherein the use information of the vCPUs includes a utilization rate of the vCPUs of the hotspot domain VM and a use time occupancy rate of the vCPUs of the hotspot domain VM;

determining to add or reduce at least one online vCPU for the hotspot domain VM, according to the comprehensive utilization rate of the vCPUs and the maximum number of the vCPUs assigned to the hotspot domain VM;

after an online vCPU is added, adjusting the vCPUs of a common domain VM in the running queue of a physical CPU bound to the online vCPU, so that the online vCPU can be dispatched on the physical CPU while the vCPUs of the common domain VM cannot be dispatched on the physical CPU; or after an online vCPU is reduced, adjusting the vCPU of the hotspot domain VM in the running queue of a physical CPU bound to the offline vCPU, so that the vCPU of the common domain VM can be dispatched on the physical CPU.

An embodiment provides a VM system, including a hotspot domain VM, common domain VMs and a VMM, wherein:

the VMM is configured to bind a different physical CPU to each of vCPUs of the hotspot domain VM;

the hotspot domain VM is configured to determine a comprehensive utilization rate of the vCPUs of the hotspot domain VM according to counted use information of the vCPUs of the hotspot domain VM, and add or reduce at least one online vCPU according to the comprehensive utilization rate of the vCPUs and the maximum number of the vCPUs assigned to the hotspot domain VM; wherein the use information of the vCPUs includes a utilization rate of the vCPUs of the hotspot domain VM and a use time occupancy rate of the vCPUs of the hotspot domain VM;

the VMM is further configured to adjust the vCPUs of a common domain VM in the running queue of a physical CPU bound to an online vCPU after the online vCPU is added, so that the online vCPU can be dispatched on the physical CPU while the vCPUs of the common domain VM cannot be dispatched on the physical CPU; and the VMM is further configured to adjust the vCPU of the hotspot domain VM in the running queue of a physical CPU bound to an offline vCPU after the online vCPU is reduced, so that vCPUs of the common domain VM can be dispatched on the physical CPU.

With the method for dispatching CPUs of a hotspot domain VM CPU and the VM system according to the embodiments, the hotspot domain VM dynamically adjusts the number of the online vCPUs in the hotspot domain VM according to the use information of the vCPUs. When the vCPUs of the hotspot domain VM have a heavy load, an online vCPU is added to the hotspot domain VM, and the VMM enables the added online vCPU to exclusively occupy the bound physical CPU, so that the online vCPU of the common domain VM cannot be dispatched on the physical CPU. Thus, the vCPU of the hotspot domain VM may preferably use the physical CPU prior to the vCPU of the common domain VM, so that a response to the request from the vCPU of the hotspot domain VM can be made in time, and the phenomenon that the vCPU of the common domain VM waits for the hotspot domain VM is avoided, thereby improving the whole performance of the virtual system. When the vCPUs of the hotspot domain VM have a light load, the VMM deletes an online vCPU from the hotspot domain VM, and cancels the exclusivity of the vCPU of the hotspot domain VM to the physical CPU, so that the vCPU of the common domain VM can be dispatched on physical CPU, thereby improving the performance of the common domain VM, and preventing the waste of the CPU resources.

BRIEF DESCRIPTION OF THE DRAWINGS

In order to more clearly describe the technical solutions of the embodiments or the prior art, the drawings to be used in the descriptions of the embodiments or the prior art are briefly introduced as follows. It will be appreciated that the following drawings are exemplary.

DETAILED DESCRIPTION OF THE PREFERRED EMBODIMENTS

In order to make the objects, technical solutions and advantages disclosed in the application clearer, the technical solutions of the embodiments will be clearly and completely described as follows with reference to the drawings. The described embodiments are merely exemplary and do not represent all possible embodiments. It is understood that other embodiments obtained by a person skilled in the art may fall within the protection scope of the claims.

An embodiment provides a method for dispatching CPUs of a hotspot domain VM to dynamically adjust the number of vCPUs in the hotspot domain VM according to the system load, and assign exclusive physical CPU resources thereto.

Figure 1A:
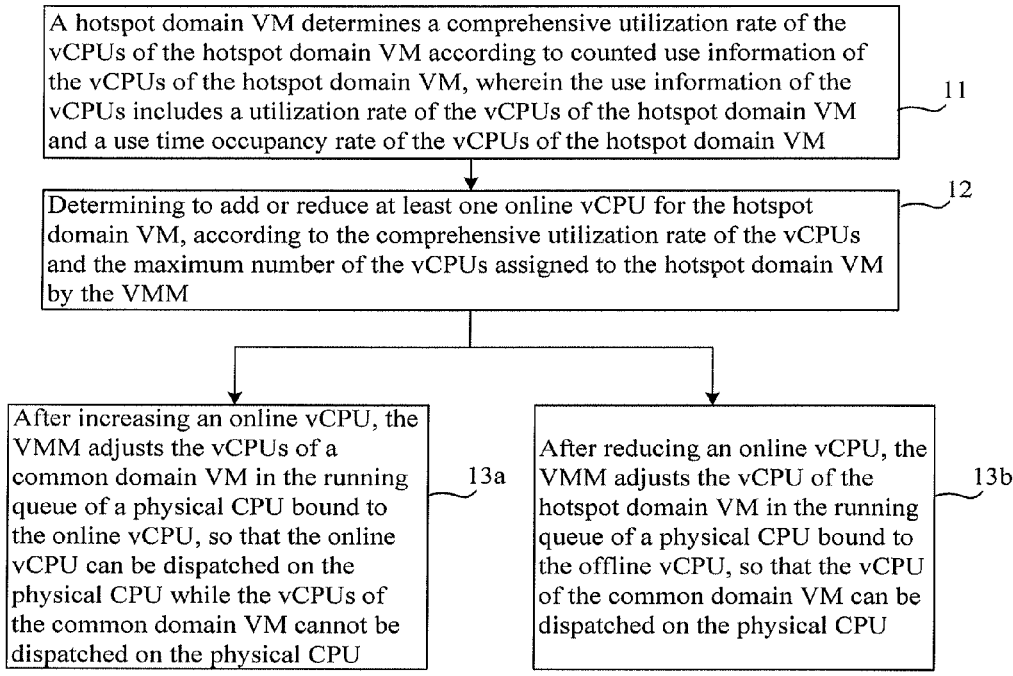
FIG. 1A is a flowchart of a method for dispatching CPUs of a hotspot domain VM according to an embodiment.
Figure 1B:
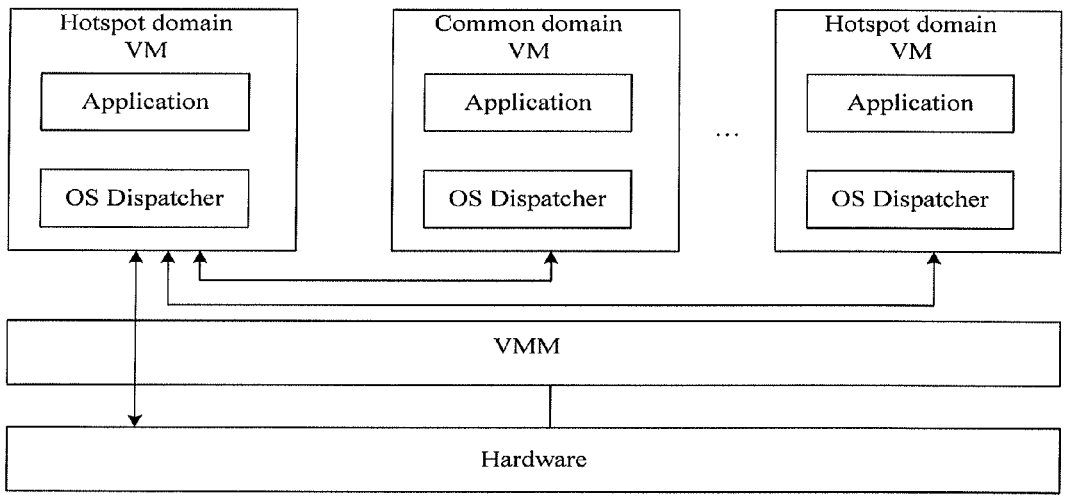
FIG. 1B is a structure diagram of a VM according to an embodiment.

FIG. 1A is a flowchart of a method for dispatching CPUs of a hotspot domain VM according to an embodiment, and FIG. 1B is a structure diagram of a VM according to an embodiment. As illustrated in FIG. 1B, the VMM directly manages the bottom hardware resources, and creates a VM independent from the bottom hardware for a use by the upper-layer OS and applications. Each VM includes applications (APPS) and an OS dispatcher. Herein, the VM includes one hotspot domain VM and multiple common domain VMs each depending on the hotspot domain VM. The vCPU of the VM is in either an online state or an offline state. The online vCPU may be used by the VM OS while being dispatched by the VMM to the physical CPU. The online vCPU assigned with a thread is a non-idle online vCPU, otherwise it is an idle online vCPU.

When creating vCPUs for the hotspot domain VM, the embodiment binds a different physical CPU to each vCPU of the hotspot domain VM, i.e., the vCPUs of the hotspot domain VM are one-by-one corresponding to the physical CPUs. The vCPU of the hotspot domain VM can only operate in the bound physical CPU. In case of an offline vCPU of the hotspot domain VM, the VMM may temporarily assign the physical CPU corresponding to the offline vCPU to a vCPU of the common domain VM for a use. Once the vCPU becomes online (becoming online from offline), the vCPU of the common domain VM will not use the physical CPU corresponding to the online vCPU.

The embodiment is described hereinafter with reference to FIG. 1A.

In step 11, the hotspot domain VM determines a comprehensive utilization rate of the vCPUs of the hotspot domain VM according to counted use information of the vCPUs of the hotspot domain VM, wherein the use information of the vCPUs includes a utilization rate of the vCPUs of the hotspot domain VM and a use time occupancy rate of the vCPUs of the hotspot domain VM.

The hotspot domain VM monitors the use information of the vCPUs of the hotspot domain VM in real time, including: the utilization rate of the vCPUs of the hotspot domain VM counted from the OS dispatcher of the hotspot domain VM and the use time occupancy rate of all the vCPUs of the hotspot domain VM obtained from the VMM, and the hotspot domain VM determines the comprehensive utilization rate of the vCPUs of the hotspot domain VM according to the utilization rate of the vCPUs and the use time occupancy rate of the vCPUs.

Herein, the use time occupancy rate of the vCPUs of the hotspot domain VM may be determined from a sum of the operation time and a sum of the wait time of all the vCPUs of the hotspot domain VM. For example, the use time occupancy rate of the vCPUs of the hotspot domain VM is a ratio of the sum of the operation time of all the vCPUs of the hotspot domain VM to the total time, wherein the total time is a sum of the operation time of all the vCPUs and the wait time of all the vCPUs.

Herein, the utilization rate of the vCPUs of the hotspot domain VM is determined from the actual non-idle time of the vCPUs inside the VM. The utilization rate of the vCPUs of the hotspot domain VM is determined as a ratio of a sum of the non-idle time of all the vCPUs inside the hotspot domain VM to a sum of the operation time of all the online vCPUs of the hotspot domain VM.

In step 12, it is determined to add or reduce at least one online vCPU for the hotspot domain VM, according to the comprehensive utilization rate of the vCPUs and the number of the vCPUs assigned to the hotspot domain VM by the VMM.

The comprehensive utilization rate of the vCPUs of the hotspot domain VM may reflect the use condition of the vCPUs by the hotspot domain VM. A high comprehensive utilization rate of the vCPUs of the hotspot domain VM indicates a heavy load of the online vCPUs of the hotspot domain VM, and the number of the online vCPUs may be increased for the hotspot domain VM. A low comprehensive utilization rate of the vCPUs of the hotspot domain VM indicates a light load of the online vCPUs of the hotspot domain VM, and the number of the online vCPUs may be decreased for the hotspot domain VM. During the increase of the online vCPU(s), online operation may be performed on one or more offline vCPUs of the hotspot domain VM.

During the decrease of one or more online vCPUs, offline operation may be performed on one or more online vCPUs of the hotspot domain VM.

When the VM system is initialized, the VMM assigns a certain number of vCPUs to the hotspot domain VM. By default, the maximum number of the vCPUs assigned to the hotspot domain VM by the VMM is the same as the number of the physical CPUs. When the hotspot domain VM has no enough vCPUs, the OS dispatcher of the hotspot domain VM adds online vCPUs to the hotspot domain VM, but the number of the online vCPUs of the hotspot domain VM shall not exceed the number of the vCPUs assigned to the hotspot domain VM by the VMM. That is, when the number of the online vCPUs of the hotspot domain VM is equal to the maximum number of the vCPUs initially assigned to the hotspot domain VM by the VMM, all the vCPUs assigned to the hotspot domain VM by the VMM are in the online state, and no more online vCPU can be added to the hotspot domain VM.

In step 13a, after an online vCPU is added, the VMM adjusts the vCPUs of the common domain VM in the running queue of a physical CPU bound to the online vCPU, so that the online vCPU can be dispatched on the physical CPU while the vCPUs of the common domain VM cannot be dispatched on the physical CPU.

After adding the online vCPU to the hotspot domain VM, the VMM adjusts the vCPU of the common domain VM in the running queue of the physical CPU bound to the online vCPU, so that the online vCPU exclusively occupies the bound physical CPU. A specific method may include: the VMM creates a running queue for each physical CPU, and all the vCPUs are added to different running queues to wait for a dispatching by the VMM. After adding the online vCPU to the hotspot domain VM, the VMM incorporates the online vCPU into the running queue of the physical CPU bound to the online vCPU while removing all the vCPUs of the common domain VM from the running queue of the physical CPU, and records the removed vCPUs in the affinity information of the physical CPU.

In step 13b, after an online vCPU is reduced, the VMM adjusts the vCPU of the hotspot domain VM in the running queue of a physical CPU bound to the offline vCPU, so that the vCPU of the common domain VM can be dispatched on the physical CPU.

When the online vCPU of the hotspot domain VM is reduced, one or more online vCPUs are changed to be offline, the VMM adjusts the vCPU of the hotspot domain VM in the running queue of the physical CPU bound to the offline vCPU, and cancels the exclusivity of the offline vCPU to the bound physical CPU, so that the vCPU of the common domain VM can be dispatched in the running queue of the bound physical CPU. A specific method may include: the VMM removes the offline vCPU from the running queue of the bound physical CPU, and incorporates the vCPU of the common domain VM recorded in the affinity information of the physical CPU bound to the offline vCPU into the running queue of the physical CPU bound to the offline vCPU.

With the method for dispatching CPUs of a hotspot domain VM according to the embodiment, the hotspot domain VM dynamically adjusts the number of the online vCPUs in the hotspot domain VM according to the use information of the vCPUs. When the vCPUs of the hotspot domain VM have a heavy load, an online vCPU is added to the hotspot domain VM, and the VMM enables the added online vCPU to exclusively occupy the bound physical CPU, so that the online vCPU of the common domain VM cannot be dispatched on the physical CPU. Thus, the vCPU of the hotspot domain VM may preferably use the physical CPU prior to the vCPU of the common domain VM, so that a response to the request from the vCPU of the hotspot domain VM can be made in time, and the phenomenon that the vCPU of the common domain VM waits for the hotspot domain VM is avoided, thereby improving the whole performance of the virtual system. When the vCPUs of the hotspot domain VM have a light load, the VMM deletes an online vCPU from the hotspot domain VM, and cancels the exclusivity of the vCPU of the hotspot domain VM to the physical CPU, so that the vCPU of the common domain VM can be dispatched on physical CPU, thereby improving the performance of the common domain VM, and preventing the waste of the CPU resources.

Figure 2:
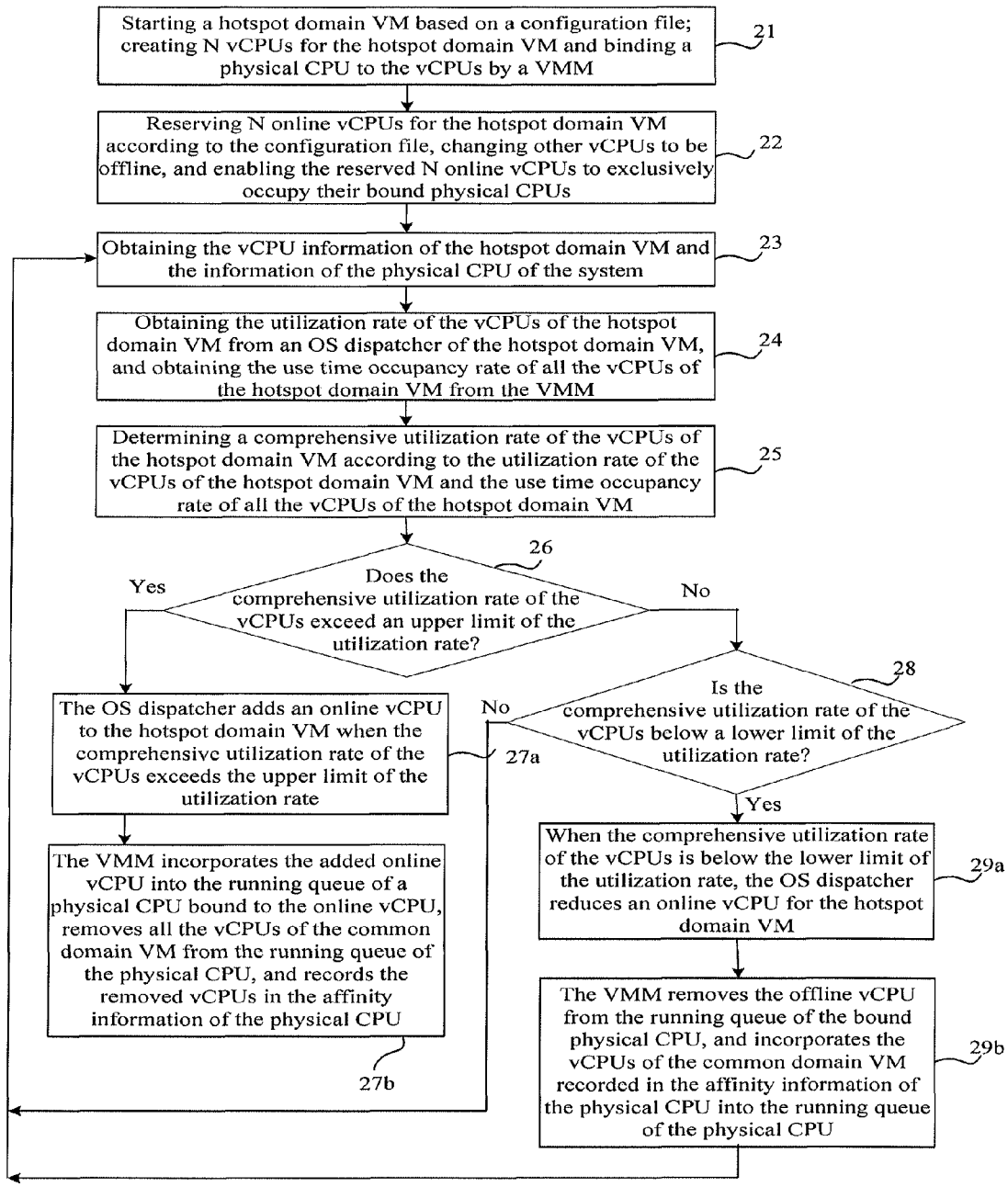
FIG. 2 is a flowchart of another method for dispatching CPUs of a hotspot domain VM according to an embodiment.

FIG. 2 is a flowchart of another method for dispatching CPUs of a hotspot domain VM according to an embodiment. The embodiment is described hereinafter with reference to FIG. 2.

In step 21, the hotspot domain VM is started based on a configuration file, and the VMM creates N vCPUs for the hotspot domain VM and binds a physical CPU to each vCPU.

During the initialization of the virtual system, the hotspot domain VM is started based on the configuration file specifying the maximum number N and the minimum number n of the vCPUs that can be owned by the hotspot domain VM. After the hotspot domain VM is started, the number of the vCPUs assigned to the hotspot domain VM by the VMM is N, which has to be less than or equal to the number of the actual physical CPUs. By default, the maximum number of the vCPUs is the same as the number of the physical CPUs. When being created, each vCPU of the hotspot domain VM is bound to one physical CPU, i.e., the corresponding vCPU can only be dispatched on the bound physical CPU, so as to prevent the vCPUs of the hotspot domain VM from migrating to other physical CPU due to the optimization by the VMM dispatcher.

In step 22, n online vCPUs is reserved for the hotspot domain VM according to the configuration file, and other vCPUs are changed to be offline. The reserved n online vCPUs is enabled to exclusively occupy their bound physical CPUs.

When the hotspot domain VM is started, the VMM creates N vCPUs for the hotspot domain VM. When the system starts to run, only n online vCPUs are reserved, and other N-n vCPUs are changed to be offline. Subsequently, after the OS dispatcher adds or reduces the online vCPU for the hotspot domain VM, the number of the online vCPUs of the hotspot domain VM varies between N and n.

In step 23, the vCPU information of the hotspot domain VM and the information of the physical CPU of the system are obtained.

The vCPU information of the hotspot domain VM obtained from the VMM includes not only the state (online and offline) of each vCPU of the hotspot domain VM and the number of the vCPUs, but also the physical CPUs bound to the online vCPUs. The CPU information of the physical system mainly includes the number of the physical CPUs.

In step 24, a performance statistics module obtains the utilization rate of the vCPUs of the hotspot domain VM from the OS dispatcher of the hotspot domain VM, and obtains the use time occupancy rate of all the vCPUs of the hotspot domain VM from the VMM.

The OS dispatcher of the hotspot domain VM counts the utilization rate of the vCPUs of the hotspot domain VM, and the VMM counts the use time occupancy rate of all the vCPUs of the hotspot domain VM. The use time occupancy rate of the vCPUs of the hotspot domain VM may be a ratio of a sum of the operation time of all the vCPUs of the hotspot domain VM to the total time, wherein the total time is a sum of the operation time of all the vCPUs and the wait time of all the vCPUs. The utilization rate of the vCPUs of the hotspot domain VM may be a ratio of a sum of the non-idle time of all the vCPUs inside the hotspot domain VM to a sum of the operation time of all the online vCPUs of the hotspot domain VM.

In step 25, the performance statistics module determines a comprehensive utilization rate of the vCPUs of the hotspot domain VM according to the utilization rate of the vCPUs of the hotspot domain VM and the use time occupancy rate of all the vCPUs of the hotspot domain VM.

The comprehensive utilization rate of the vCPUs of the hotspot domain VM may be a product of the utilization rate of the vCPUs of the hotspot domain VM and the use time occupancy rate of all the vCPUs of the hotspot domain VM.

In step 26, an analysis and decision module judges whether the comprehensive utilization rate of the vCPUs of the hotspot domain VM exceeds an upper limit of the utilization rate. If yes, steps 27a-27b are performed, otherwise step 28 is performed.

In step 27a, the OS dispatcher adds an online vCPU to the hotspot domain VM when the comprehensive utilization rate of the vCPUs exceeds the upper limit of the utilization rate.

When the comprehensive utilization rate of the vCPUs exceeds the upper limit of the utilization rate, the analysis and decision module determines to add an online vCPU to the hotspot domain VM. When it is determined to add an online vCPU to the hotspot domain VM, the OS dispatcher judges whether the number of the online vCPUs of the hotspot domain VM obtained in step 22 is less than the maximum number N of the vCPUs assigned to the hotspot domain VM by the VMM; if yes, the OS dispatcher changes an offline vCPU to be online according to the state of each vCPU obtained in step 23.

In step 27b, the VMM incorporates the added online vCPU into the running queue of a physical CPU bound to the online vCPU, removes all the vCPUs of the common domain VM from the running queue of the physical CPU, and records the removed vCPUs in the affinity information of the physical CPU. After step 27b, the flow returns to step 23 to continue the execution until the virtual system is started next time.

After adding an online vCPU, the OS dispatcher notifies the VMM to perform an exclusive operation on the online vCPU. The VMM determines the physical CPU bound to the added online vCPU according to the vCPU information obtained in step 23, and incorporates the online vCPU into the running queue of the bound physical CPU. Next, the VMM traverses all the vCPUs of the common domain VM. The VMM removes all the vCPUs of the common domain VM from the running queue of the bound physical CPU, and records the removed vCPUs in the affinity information of the physical CPU, so as to recover the vCPUs of the common domain VM to the running queue of the physical CPU when the vCPUs of the common domain VM are subsequently allowed to be dispatched on the physical CPU.

In step 28, the analysis and decision module judges whether the comprehensive utilization rate of the vCPUs of the hotspot domain VM is below a lower limit of the utilization rate; if yes, the flow goes to step 29a, otherwise the OS dispatcher maintains the number of the vCPUs of the hotspot domain VM, and the flow returns to step 23 to continue the execution.

In step 29a, when the comprehensive utilization rate of the vCPUs is below the lower limit of the utilization rate, the OS dispatcher reduces an online vCPU for the hotspot domain VM.

When the comprehensive utilization rate of the vCPUs is below the lower limit of the utilization rate, the analysis and decision module determines to reduce an online vCPU for the hotspot domain VM. According to the state of each vCPU obtained in step 23, the OS dispatcher may select an online vCPU having the maximum serial number and perform an offline operation thereon so that the online vCPU becomes offline. Herein, the upper and lower limits of the utilization rate may be empirical values set according to different application scenarios.

In step 29b, the VMM removes the offline vCPU from the running queue of the bound physical CPU, and incorporates the vCPUs of the common domain VM recorded in the affinity information of the physical CPU into the running queue of the physical CPU.

After step 29b, the flow returns to step 23 to continue the execution until the virtual system is started next time.

With the method for dispatching CPUs of a hotspot domain VM according to the embodiment, after one or more online vCPUs are added or reduced for the hotspot domain VM, the VMM adjusts the running queue of the physical CPU bound to the online vCPU. Thus when the vCPUs of the hotspot domain VM have a heavy load, the added online vCPU exclusively occupies the bound physical CPU, and when the vCPUs of the hotspot domain VM have a light load, the vCPUs of the common domain VM are dispatched on the physical CPU.

Figure 3:
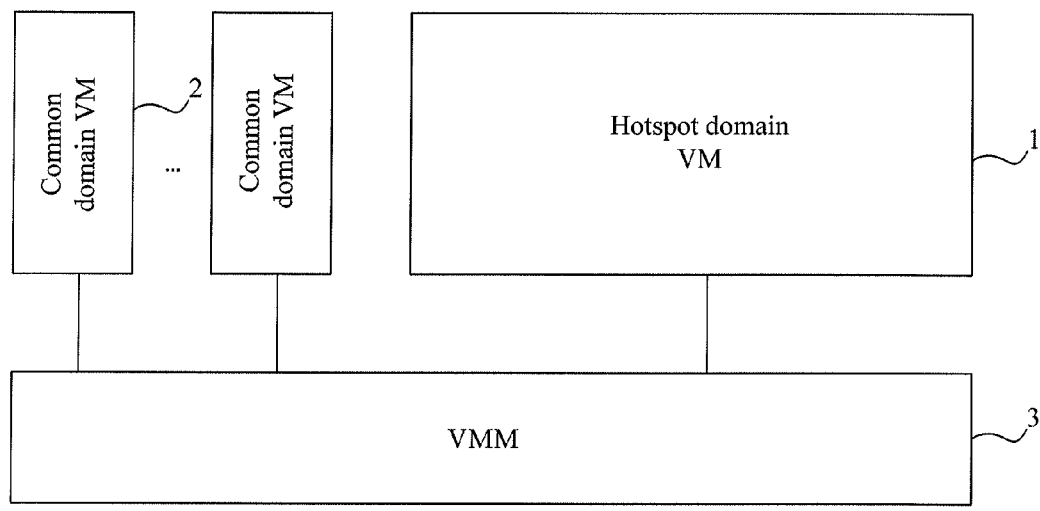
FIG. 3 is a structure diagram of a VM system according to an embodiment.

FIG. 3 is a structure diagram of a VM system according to an embodiment. As illustrated in FIG. 3, the VM system according to the embodiment includes: a hotspot domain VM 1, a plurality of common domain VMs 2, and a VM Monitor (VMM) 3.

The VMM 3 is configured to bind a different physical CPU to each of vCPUs of the hotspot domain VM.

The hotspot domain VM 1 is configured to determine a comprehensive utilization rate of the vCPUs of the hotspot domain VM according to counted use information of the vCPUs of the hotspot domain VM, and add or reduce at least one online vCPU according to the comprehensive utilization rate of the vCPUs and the maximum number of the vCPUs assigned to the hotspot domain VM; wherein the use information of the vCPUs includes the utilization rate of the vCPUs of the hotspot domain VM and the use time occupancy rate of the vCPUs of the hotspot domain VM.

For example, the use time occupancy rate of the vCPUs of the hotspot domain VM is a ratio of a sum of the operation time of all the vCPUs of the hotspot domain VM to the total time, wherein the total time is a sum of the operation time of all the vCPUs and the wait time of all the vCPUs. The utilization rate of the vCPUs of the hotspot domain VM may be a ratio of a sum of the non-idle time of all the vCPUs inside the hotspot domain VM to a sum of the operation time of all the online vCPUs of the hotspot domain VM.

The VMM 3 is further configured to adjust the vCPUs of the common domain VM 2 in the running queue of a physical CPU bound to an online vCPU after the online vCPU is added, so that the online vCPU can be dispatched on the physical CPU while the vCPUs of the common domain VM cannot be dispatched on the physical CPU.

The VMM 3 is further configured to adjust the vCPU of the hotspot domain VM in the running queue of a physical CPU bound to an offline vCPU after the online vCPU is reduced, so that vCPUs of the common domain VM can be dispatched on the physical CPU.

Please refer to the descriptions in the embodiment corresponding to FIG. 1 for the functions realized by the above modules, and herein are omitted.

Particularly, the VMM 3 includes: a first adjustment unit and a second adjustment unit.

The first adjustment unit is configured to incorporate the online vCPU into the running queue of the physical CPU bound to the online vCPU, remove all the vCPUs of the common domain VM from the running queue of the physical CPU, and record the removed vCPUs in the affinity information of the physical CPU.

The second adjustment unit is configured to remove the offline vCPU from the running queue of the bound physical CPU, and incorporate the vCPU of the common domain VM recorded in the affinity information of the physical CPU into the running queue of the physical CPU.

Please refer to the descriptions in the embodiment corresponding to FIG. 1 for the functions realized by the above units, and herein are omitted.

With the VM system according to the embodiment, the hotspot domain VM dynamically adjusts the number of the online vCPUs in the hotspot domain VM according to the use information of the vCPUs. When the vCPUs of the hotspot domain VM have a heavy load, an online vCPU is added to the hotspot domain VM, and the VMM enables the added online vCPU to exclusively occupy the bound physical CPU, so that the online vCPU of the common domain VM cannot be dispatched on the physical CPU. Thus, the vCPU of the hotspot domain VM may preferably use the physical CPU prior to the vCPU of the common domain VM, so that a response to the request from the vCPU of the hotspot domain VM can be made in time, and the phenomenon that the vCPU of the common domain VM waits for the hotspot domain VM is avoided, thereby improving the whole performance of the virtual system. When the vCPUs of the hotspot domain VM have a light load, the VMM deletes an online vCPU from the hotspot domain VM, and cancels the exclusivity of the vCPU of the hotspot domain VM to the physical CPU, so that the vCPU of the common domain VM can be dispatched on physical CPU, thereby improving the performance of the common domain VM, and preventing the waste of the CPU resources.

Figure 4:
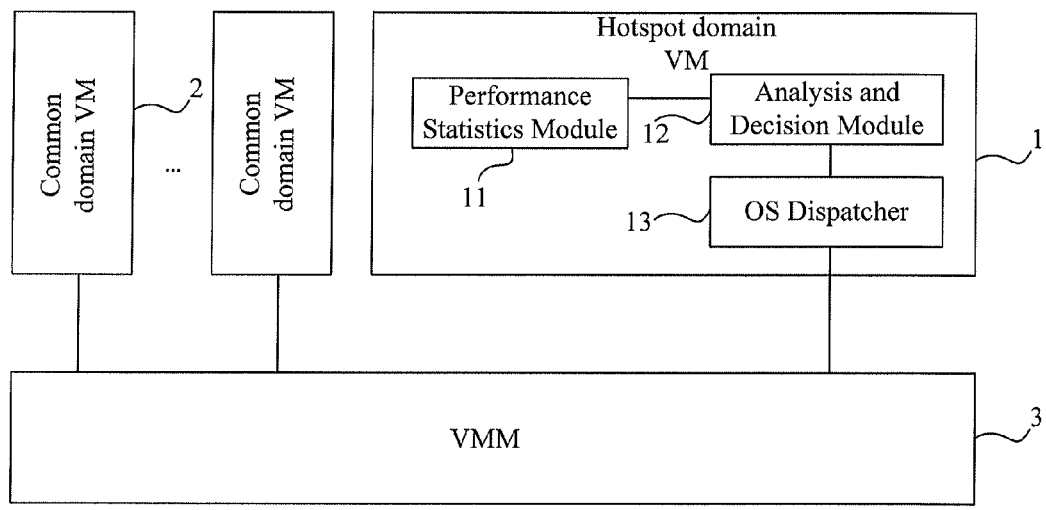
FIG. 4 is a structure diagram of another VM system according to an embodiment.

FIG. 4 is a structure diagram of another VM system according to an embodiment. As illustrated in FIG. 4, the hotspot domain VM 1 includes a performance statistics module 11, an analysis and decision module 12 and an OS dispatcher 13.

The performance statistics module 11 is configured to count the use information of the vCPUs of the hotspot domain VM, and determine a comprehensive utilization rate of the vCPUs of the hotspot domain VM according to the monitored use information of the vCPUs of the hotspot domain VM.

The analysis and decision module 12 is configured to determine to add or reduce at least one online vCPU for the hotspot domain VM according to the comprehensive utilization rate of the vCPUs determined by the performance statistics module 11 and the maximum number of the vCPUs assigned to the hotspot domain VM by the VM dispatcher.

The OS dispatcher 13 is configured to add or reduce at least one online vCPU according to the decision of the analysis and decision module 12.

Particularly, the performance statistics module 11 includes a first determination unit, a second determination unit and a third determination unit.

The first determination unit is configured to determine a use time occupancy rate of the vCPUs of the hotspot domain VM according to a sum of the operation time and a sum of the wait time of all the vCPUs of the hotspot domain VM. The second determination unit is configured to determine a utilization rate of the vCPUs of the hotspot domain VM according to a sum of the non-idle time of all the vCPUs inside the hotspot domain VM and a sum of the operation time of all the online vCPUs of the hotspot domain VM. The third determination unit is configured to determine a comprehensive utilization rate of the vCPUs of the hotspot domain VM according to the use time occupancy rate of the vCPUs of the hotspot domain VM and the utilization rate of the vCPUs of the hotspot domain VM.

Particularly, the analysis and decision module 12 includes an online determination unit and an offline determination unit.

The online determination unit is configured to determine to add one or more online vCPUs for the hotspot domain VM, when the comprehensive utilization rate of the vCPUs determined by the third determination unit exceeds an upper limit of the utilization rate while the number of the vCPUs of the hotspot domain VM is not more than the maximum number of the vCPUs assigned to the hotspot domain VM by the VMM. The offline determination unit is configured to determine to reduce at least one online vCPU for the hotspot domain VM, when the comprehensive utilization rate of the vCPUs determined by the third determination unit is below the lower limit of the utilization rate.

Please refer to the descriptions in the embodiment corresponding to FIG. 2 for the functions realized by the above modules, and herein are omitted.

With the VM system according to the embodiment, after one or more online vCPUs are added or reduced for the hotspot domain VM, the VMM adjusts the running queue of the physical CPU bound to the online vCPU. Thus when the vCPUs of the hotspot domain VM have a heavy load, the added online vCPU exclusively occupies the bound physical CPU, and when the vCPUs of the hotspot domain VM have a light load, the vCPUs of the common domain VM are dispatched on the physical CPU.

A person skilled in the art will appreciate that all or a part of steps for implementing the above method embodiments may be completed by instructing relevant hardware through a program that may be stored in a computer readable storage medium, and when being executed, the program performs the steps including the above method embodiments. The storage medium may include various mediums capable of storing program codes, such as ROM, RAM, magnetic disk and optical disk.

Finally to be noted, the above embodiments are just used to describe, rather than to limit the claims. It is understood the aforementioned embodiments may be modified, or some technical features thereof can be equivalently replaced. Such modified embodiments are understood to fall within the scope of protection afforded by the claims.

What is claimed is:

1. A method for dispatching central processing units (CPUs) of a hotspot domain virtual machine (VM), wherein each virtual CPU (vCPU) of a plurality of vCPUs of the hotspot domain VM is bound to a different physical CPU, the method comprising:

determining a comprehensive utilization rate of the vCPUs of the hotspot domain VM according to counted use information of the vCPUs of the hotspot domain VM, wherein the use information of the vCPUs comprises a utilization rate of the vCPUs of the hotspot domain VM and a use time occupancy rate of the vCPUs of the hotspot domain VM;

determining that at least one online vCPU is to be added or to be reduced for the hotspot domain VM, according to the comprehensive utilization rate of the vCPUs and a maximum number of the vCPUs assigned to the hotspot domain VM;

after an online vCPU is added, adjusting the vCPUs of a common domain VM in the running queue of a physical CPU bound to the online vCPU, so that the online vCPU can be dispatched on the physical CPU while the vCPUs of the common domain VM cannot be dispatched on the physical CPU; or after an online vCPU is reduced, adjusting the vCPU of the hotspot domain VM in the running queue of a physical CPU bound to the offline vCPU, so that the vCPU of the common domain VM can be dispatched on the physical CPU, wherein the hotspot domain virtual machine (VM) is a VM that is depended on by the common domain VM, wherein determining the comprehensive utilization rate of the vCPUs of the hotspot domain VM according to the counted use information of the vCPUs of the hotspot domain VM comprises:

determining the use time occupancy rate of the vCPUs of the hotspot domain VM according to a sum of operation time and a sum of wait time of all the vCPUs of the hotspot domain VM;

determining the utilization rate of the vCPUs of the hotspot domain VM according to a sum of non-idle time of all the vCPUs inside the hotspot domain VM and a sum of operation time of all the online vCPUs of the hotspot domain VM; and determining the comprehensive utilization rate of the vCPUs of the hotspot domain VM according to the use time occupancy rate of the vCPUs of the hotspot domain VM and the utilization rate of the vCPUs of the hotspot domain VM.

2. The method according to claim 1, wherein adjusting the vCPUs of the common domain VM in the running queue of the physical CPU bound to the online vCPU, so that the online vCPU can be dispatched on the physical CPU while the vCPUs of the common domain VM cannot be dispatched on the physical CPU comprises:

incorporating, by a VM dispatcher, the online vCPU into the running queue of the physical CPU bound to the online vCPU; and removing, by the VM dispatcher, all the vCPUs of the common domain VM from the running queue of the physical CPU, and recording the removed vCPUs in affinity information of the physical CPU.

3. The method according to claim 1, wherein adjusting the vCPU of the hotspot domain VM in the running queue of the physical CPU bound to the offline vCPU, so that the vCPU of the common domain VM can be dispatched on the physical CPU comprises:

removing, by a VM dispatcher, the offline vCPU from the running queue of the bound physical CPU; and incorporating, by the VM dispatcher, the vCPUs of the common domain VM recorded in affinity information of the physical CPU into the running queue of the physical CPU.

4. The method according to claim 2, wherein adjusting the vCPU of the hotspot domain VM in the running queue of the physical CPU bound to the offline vCPU, so that the vCPU of the common domain VM can be dispatched on the physical CPU comprises:

removing, by a VM dispatcher, the offline vCPU from the running queue of the bound physical CPU; and incorporating, by the VM dispatcher, the vCPUs of the common domain VM recorded in the affinity information of the physical CPU into the running queue of the physical CPU.

5. The method according to claim 4, wherein determining the comprehensive utilization rate of the vCPUs of the hotspot domain VM according to the counted use information of the vCPUs of the hotspot domain VM comprises:

determining the use time occupancy rate of the vCPUs of the hotspot domain VM according to a sum of operation time and a sum of wait time of all the vCPUs of the hotspot domain VM;

determining the utilization rate of the vCPUs of the hotspot domain VM according to a sum of non-idle time of all the vCPUs inside the hotspot domain VM and a sum of operation time of all the online vCPUs of the hotspot domain VM; and determining the comprehensive utilization rate of the vCPUs of the hotspot domain VM according to the use time occupancy rate of the vCPUs of the hotspot domain VM and the utilization rate of the vCPUs of the hotspot domain VM.

6. The method according to claim 1, wherein determining that at least one online vCPU is to be added or to be reduced for the hotspot domain VM, according to the comprehensive utilization rate of the vCPUs and the maximum number of the vCPUs assigned to the hotspot domain VM comprises:

determining to add at least one online vCPU for the hotspot domain VM when the comprehensive utilization rate of the vCPUs exceeds an upper limit of the utilization rate while the number of the vCPUs of the hotspot domain VM is not more than the maximum number of the vCPUs assigned to the hotspot domain VM by a VM dispatcher; or determining to reduce at least one online vCPU for the hotspot domain VM, when the comprehensive utilization rate of the vCPUs is below a lower limit of the utilization rate.

7. The method according to claim 5, wherein determining that at least one online vCPU is to be added or to be reduced for the hotspot domain VM, according to the comprehensive utilization rate of the vCPUs and the maximum number of the vCPUs assigned to the hotspot domain VM comprises:

determining to add at least one online vCPU for the hotspot domain VM, when the comprehensive utilization rate of the vCPUs exceeds an upper limit of the utilization rate while the number of the vCPUs of the hotspot domain VM is not more than the maximum number of the vCPUs assigned to the hotspot domain VM by a VM dispatcher; or determining to reduce at least one online vCPU for the hotspot domain VM, when the comprehensive utilization rate of the vCPUs is below a lower limit of the utilization rate.

8. A virtual machine (VM) system comprising a hotspot domain VM, a common domain VM and a VM Monitor (VMM) and a non-transitory computer-readable medium comprising instructions, which, when executed by a computer, cause the computer to perform the following steps of:

binding a different physical CPU to each virtual CPU (vCPU) of a plurality of vCPUs of a hotspot domain VM;

determining a comprehensive utilization rate of the vCPUs of the hotspot domain VM according to counted use information of the vCPUs of the hotspot domain VM, and determining to add or reduce at least one online vCPU for the hotspot domain VM according to the comprehensive utilization rate of the vCPUs and a maximum number of the vCPUs assigned to the hotspot domain VM; wherein the use information of the vCPUs comprises a utilization rate of the vCPUs of the hotspot domain VM and a use time occupancy rate of the vCPUs of the hotspot domain VM;

adjusting the vCPUs of a common domain VM in the running queue of a physical CPU bound to an online vCPU after the online vCPU is added, so that the online vCPU can be dispatched on the physical CPU while the vCPUs of the common domain VM cannot be dispatched on the physical CPU; and adjusting the vCPU of the hotspot domain VM in the running queue of a physical CPU bound to an offline vCPU after the online vCPU is reduced, so that vCPUs of the common domain VM can be dispatched on the physical CPU, wherein the hotspot domain virtual machine (VM) is a VM that is depended on by the common domain VM, wherein the determining a comprehensive utilization rate of the vCPUs comprises:

determining the use time occupancy rate of the vCPUs of the hotspot domain VM according to a sum of operation time and a sum of wait time of all the vCPUs of the hotspot domain VM;

determining the utilization rate of the vCPUs of the hotspot domain VM according to a sum of non-idle time of all the vCPUs inside the hotspot domain VM and a sum of operation time of all the online vCPUs of the hotspot domain VM; and determining the comprehensive utilization rate of the vCPUs of the hotspot domain VM according to the use time occupancy rate of the vCPUs of the hotspot domain VM and the utilization rate of the vCPUs of the hotspot domain VM.

9. The system according to claim 8, further comprising instructions, which, when executed by the computer, cause the computer to:

count use information of the vCPUs of the hotspot domain VM, and determine a comprehensive utilization rate of the vCPUs of the hotspot domain VM according to the use information of the vCPUs of the hotspot domain VM;

determine to add or reduce at least one online vCPU for the hotspot domain VM according to the comprehensive utilization rate of the vCPUs and the maximum number of the vCPUs assigned to the hotspot domain VM by a VM dispatcher; and add or reduce at least one online vCPU according to the decision of the analysis and decision module.

10. The system according to claim 9 further comprising instructions, which, when executed by the computer, cause the computer to:

determine to add one or more online vCPUs for the hotspot domain VM, when the comprehensive utilization rate of the vCPUs exceeds an upper limit of the utilization rate while the number of the vCPUs of the hotspot domain VM is not more than the maximum number of the vCPUs assigned to the hotspot domain VM by the VMM; and determine to reduce at least one online vCPU for the hotspot domain VM, when the comprehensive utilization rate of the vCPUs is below a lower limit of the utilization rate.

11. The system according to claim 8, further comprising instructions, which, when executed by the computer, cause the computer to:

incorporate the online vCPU into the running queue of a physical CPU bound to the online vCPU, remove all the vCPUs of the common domain VM from the running queue of the physical CPU, and record the removed vCPUs in affinity information of the physical CPU; and remove the offline vCPU from the running queue of the bound physical CPU, and incorporate the vCPUs of the common domain VM recorded in the affinity information of the physical CPU into the running queue of the physical CPU.

12. A physical device comprising physical CPUs, a hotspot domain virtual machine (VM), a common domain VM, and a VM Monitor (VMM), wherein:

the VMM is configured to bind a different physical CPU of the physical CPUs to each virtual CPU (vCPU) of a plurality of vCPUs of the hotspot domain VM;

the hotspot domain VM is configured to determine a comprehensive utilization rate of the vCPUs of the hotspot domain VM according to counted use information of the vCPUs of the hotspot domain VM, and determine that at least one online vCPU is to be added or to be reduced for the hotspot domain VM according to the comprehensive utilization rate of the vCPUs and a maximum number of the vCPUs assigned to the hotspot domain VM, wherein the use information of the vCPUs comprises a utilization rate of the vCPUs of the hotspot domain VM and a use time occupancy rate of the vCPUs of the hotspot domain VM;

the VMM is further configured to adjust the vCPUs of the common domain VM in the running queue of a physical CPU bound to an online vCPU after the online vCPU is added, so that the online vCPU can be dispatched on the physical CPU while the vCPUs of the common domain VM cannot be dispatched on the physical CPU; and the VMM is further configured to adjust the vCPU of the hotspot domain VM in the running queue of a physical CPU bound to an offline vCPU after the online vCPU is reduced, so that vCPUs of the common domain VM can be dispatched on the physical CPU, wherein the hotspot domain virtual machine (VM) is a VM that is depended on by the common domain VM, wherein in determining the comprehensive utilization rate of the vCPUs of the hotspot domain VM according to the counted use information of the vCPUs of the hotspot domain VM, the hotspot domain VM is further configured to:

determine the use time occupancy rate of the vCPUs of the hotspot domain VM according to a sum of operation time and a sum of wait time of all the vCPUs of the hotspot domain VM;

determine the utilization rate of the vCPUs of the hotspot domain VM according to a sum of non-idle time of all the vCPUs inside the hotspot domain VM and a sum of operation time of all the online vCPUs of the hotspot domain VM; and determine the comprehensive utilization rate of the vCPUs of the hotspot domain VM according to the use time occupancy rate of the vCPUs of the hotspot domain VM and the utilization rate of the vCPUs of the hotspot domain VM.

13. The physical device according to claim 12, wherein in determining that at least one online vCPU is to be added or to be reduced for the hotspot domain VM, according to the comprehensive utilization rate of the vCPUs and the maximum number of the vCPUs assigned to the hotspot domain VM, the hotspot domain VM is further configured to:

determine to add at least one online vCPU for the hotspot domain VM when the comprehensive utilization rate of the vCPUs exceeds an upper limit of the utilization rate while the number of the vCPUs of the hotspot domain VM is not more than the maximum number of the vCPUs assigned to the hotspot domain VM by a VM dispatcher; and determine to reduce at least one online vCPU for the hotspot domain VM when the comprehensive utilization rate of the vCPUs is below a lower limit of the utilization rate.

* * * * *